US007317440B2

(12) United States Patent
Chung

(10) Patent No.: US 7,317,440 B2
(45) Date of Patent: Jan. 8, 2008

(54) CIRCUIT AND METHOD FOR DRIVING A LIQUID CRYSTAL DISPLAY DEVICE USING LOW POWER

(75) Inventor: Kyu-young Chung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 430 days.

(21) Appl. No.: 10/640,281

(22) Filed: Aug. 13, 2003

(65) Prior Publication Data

US 2004/0036670 A1 Feb. 26, 2004

(30) Foreign Application Priority Data

Aug. 20, 2002 (KR) ................................ 2002-49295

(51) Int. Cl.
*G09G 3/36* (2006.01)
*G09G 5/00* (2006.01)
*G06F 3/038* (2006.01)

(52) U.S. Cl. ............................ 345/89; 345/98; 345/99; 345/100; 345/211

(58) Field of Classification Search .................. 345/89
See application file for complete search history.

(56) References Cited

U.S. PATENT DOCUMENTS 6,147,665 A 11/2000 Friedman .................. 345/75.2
6,229,530 B1 * 5/2001 Ushiki ........................ 345/204
6,313,830 B1 * 11/2001 Yusa .......................... 345/204
6,496,063 B2 * 12/2002 Hinrichsen et al. ......... 330/129
6,496,175 B1 * 12/2002 Fukuo ......................... 345/99
6,670,941 B2 * 12/2003 Albu et al. .................. 345/98
6,737,958 B1 * 5/2004 Satyanarayana ........... 340/14.1
6,914,587 B2 * 7/2005 Kosaka ........................ 345/89
2002/0180685 A1 * 12/2002 Itakura et al. .............. 345/100
2004/0212740 A1 * 10/2004 Keller ......................... 348/707

FOREIGN PATENT DOCUMENTS

JP 8-160917 6/1996

(Continued)

*Primary Examiner*—Richard Hjerpe
*Assistant Examiner*—Alexander S. Beck
(74) *Attorney, Agent, or Firm*—Mills & Onello. LLP

(57) ABSTRACT

Provided are a circuit and method for driving a liquid crystal display device using low power. The circuit includes a display data latch, a gamma decoder, and a driver cell circuit. The display data latch latches display data from a memory. The gamma decoder receives a plurality of gray scale voltages, and selects and outputs one of the plurality of gray scale voltages in response to the display data. The driver cell circuit receives an output voltage of the gamma decoder and generates an output voltage applied to the liquid crystal display device. The driver cell circuit controls a slew rate in response to comparison result of current data and previous data of the display data. The driver cell circuit includes a previous data latch, a bias control voltage generator, and a driver amplifier. The previous data latch receives a portion or the whole of the display data and outputs the portion or the whole of the display data as the previous data. The bias control voltage generator compares the current data and the previous data of the display data and generates a control signal. The driver amplifier receives the output voltage of the gamma decoder, generates the output voltage applied to the liquid crystal display device, and controls the slew rate in response to the control signal.

19 Claims, 13 Drawing Sheets

FOREIGN PATENT DOCUMENTS

| | | | |
|---|---|---|---|
| JP | 10-187100 | | 7/1998 |
| JP | 2001-343944 | | 12/2001 |
| JP | 2001343944 A | * | 12/2001 |
| KR | 98-067903 | | 10/1998 |
| KR | 10-0357945 | | 10/2002 |

* cited by examiner

FIG. 13

| CD<5> | CD<4> | PD<5> | PD<4> | HSL | LSL |
|---|---|---|---|---|---|
| 0 | 0 | 0 | 0 | 0 | 1 |
| 0 | 0 | 0 | 1 | 0 | 1 |
| 0 | 0 | 1 | 0 | 1 | 0 |
| 0 | 0 | 1 | 1 | 1 | 0 |
| 0 | 1 | 0 | 0 | 0 | 1 |
| 0 | 1 | 0 | 1 | 0 | 1 |
| 0 | 1 | 1 | 0 | 0 | 1 |
| 0 | 1 | 1 | 1 | 1 | 0 |
| 1 | 0 | 0 | 0 | 1 | 0 |
| 1 | 0 | 0 | 1 | 0 | 1 |
| 1 | 0 | 1 | 0 | 0 | 1 |
| 1 | 0 | 1 | 1 | 0 | 1 |
| 1 | 1 | 0 | 0 | 1 | 0 |
| 1 | 1 | 0 | 1 | 1 | 0 |
| 1 | 1 | 1 | 0 | 0 | 1 |
| 1 | 1 | 1 | 1 | 0 | 1 |

CIRCUIT AND METHOD FOR DRIVING A LIQUID CRYSTAL DISPLAY DEVICE USING LOW POWER

BACKGROUND OF THE INVENTION

This application claims the priority of Korean Patent Application No. 2002-49295 filed on Aug. 20, 2002 in the Korean Intellectual Property Office, the contents of which are incorporated herein in their entirety by reference.

1. Field of the Invention

The present invention relates to a display device, and more particularly, to a method and circuit for driving a panel of a thin film transistor liquid crystal display device using low power.

2. Description of the Related Art

A circuit for driving a thin film transistor (hereinafter referred to as a TFT) liquid crystal display (hereinafter referred to as an LCD) device is generally classified into a gate driver circuit and a source driver circuit.

FIG. 1 is a view of a general TFT-LCD device. Referring to FIG. 1, the general TFT-LCD device includes a liquid crystal panel 110, a gate driver circuit 120, and a source driver circuit 130.

The liquid crystal panel 110 includes a liquid crystal, storage capacitors CST, and switches ST. The liquid crystal may be modeled as a liquid crystal capacitor CL. Thus, the liquid crystal panel 110 may be modeled as a structure in which liquid crystal cells 111 having a liquid crystal capacitor CL, a storage capacitor CST, and a switch ST are arranged as many as the number L of channels in the row and as many as the number of lines in the column.

A node of the liquid crystal capacitor CL is connected to a corresponding switch ST. The switch ST is an MOS transistor having a gate to which a voltage output from the gate driver circuit 120 is applied. The gate driver circuit 120 turns on/off gates of the switches ST.

The source driver circuit 130 inputs a gradation voltage (or a gray scale voltage) corresponding to display data to the liquid crystal. if switches in a specific line are turned on by the voltage output from the gate driver circuit 120, the gradation voltage output from the source driver circuit 130 is applied to the liquid crystal capacitor CL connected to the turned on switches. The storage capacitors CST are capacitors used to reduce current leaking from the liquid crystal.

Of the gate driver circuit 120 and the source driver circuit 130, the source driver circuit 130 accounts for a large portion of the whole power consumption. In particular, in the source driver circuit 130, driver amplifiers 131 through 13L, which form ends of channels for actually driving the liquid crystal, consume a large portion of power. Thus, reducing power consumption in the source driver circuit 130, particularly, in the driver amplifiers 131 through 13L, is the most efficient method of reducing the power consumption of the whole driver circuit.

FIG. 2 is a view of the driver amplifier 131 shown in FIG. 1.

The power consumed in the driver amplifier 131 is classified as static power and driving power. The static power is consumed by a constant current IS for stably driving the driver amplifier 131. The driving power is consumed by a driving current ID for driving a liquid crystal capacitor and a storage capacitor.

The power consumption of the driving amplifier 131 is obtained by Equation 1.

$$P\_TOT = PS + PD = IS \times VDD + CL\_EFF \times VOS \times F \qquad (1)$$

wherein, P_TOT is the whole power consumption of the driver amplifier 131, PS is the static power of the driver amplifier 131, PD is the driving of the driver amplifier 131, IS is the constant current of the driver amplifier 131, CL_EFF is the equivalent capacitance for the liquid crystal capacitor and the storage capacitor, VDD is a power voltage, VOS is a voltage difference in an operation section of an output voltage VOUT of the driver amplifier 131, and F is an operation frequency of a display device.

In Equation 1, since the driving power PD of the driver amplifier 131 depends on a load CL_EFF of the liquid crystal panel and the operation frequency F of the display device, the driving power PD is limited to being reduced. Thus, the power consumption P_TOT of the driver amplifier 131 can be reduced by reducing the static power PS by the constant current IS of the driver amplifier 131.

The configuration of the driver amplifier 131 shown in FIG. 1 will be described in more detail with reference to FIG. 3. Referring to FIG. 3, the driver amplifier 131 generally includes an amplifying stage 131_1 and a driving stage 131_2.

The constant current IS in the driver amplifier 131 having the configuration shown in FIG. 3 is classified into a bias current IB flowing in the amplifying stage 131_1 having an input differential pair and a driving stage constant current IQ flowing in the driving stage 131_2 for driving a large load. The bias current IB with a compensation capacitor CC determines a slew rate of the driver amplifier 131 as in Equation 2. The driving stage constant current IQ determines a transconductance gm of driving transistors PM1 and NM1 of the driving stage 131_2 and affects a phase margin representing the stability of the driver amplifier 131.

$$SR = \frac{IB}{CC} \qquad (2)$$

wherein, SR is the slew rate of the driver amplifier 131, IB is the bias current IB, and CC is the capacitance of the compensation capacitor CC.

In a case of a driver amplifier used in an existing TFT-LCD driver circuit, the bias current IB determining the slew rate is designed so as to satisfy a driver output setup time characteristic required in the worst case, i.e., if the output voltage VOUT of the driver amplifier 131 swings at its maximum.

FIG. 4 is a view illustrating output characteristics of a driver amplifier according to the prior art.

As described above, the driver amplifier according to the prior art is designed so as to satisfy a driver output setup time tD required when an output voltage VOUT of the driver amplifier swings at its maximum. That is, in FIG. 4, the slope of the output voltage VOUT has to satisfy G1. Thus, even when the output voltage VOUT of the driver amplifier does not greatly vary, the slope of the output voltage VOUT G2 is equal to G1. In this case, the driver output setup time tD is reduced more than necessary. Therefore, a bias current of a more than admissible value flows in the driver amplifier, which results in an increase in the whole power consumption of an LCD driver circuit.

Accordingly, in order to reduce the power consumption, it is preferable that in a case where the output voltage VOUT of the driver amplifier does not vary greatly, the slope G2 of the output voltage VOUT is gentle as shown in FIG. 4 compared with a case where the output voltage VOUT swings at its maximum. That is, it is preferable that the slew rate of the driver amplifier be low in terms of power consumption.

Since a driver amplifier for driving an LCD device according to the prior art uses a fixed slew rate regardless of variations in an output voltage, power is unnecessarily consumed.

SUMMARY OF THE INVENTION

Accordingly, the present invention provides a driver circuit, for driving an LCD device, which minimizes power consumption by adaptively controlling slew rate of the driver amplifier.

The present invention also provides an LCD device driving circuit having the driver circuit for driving the LCD device.

The present invention also provides a method of driving an LCD device by which power consumption can be reduced by adaptively controlling a slew rate of a driver amplifier.

According to an aspect of the present invention, there is provided a driver circuit for driving a liquid crystal display device. The driver circuit includes a previous data latch, a bias control voltage generator, and a driver amplifier. The previous data latch receives at least a portion of display data and outputs the received display data as previous data. The bias control voltage generator compares current data of the display data with the previous data and generates a control signal. The driver amplifier receives an input voltage, generates an output voltage, and controls a slew rate in response to the control signal.

Preferably, the driver amplifier controls a bias current in response to the control signal so as to control the slew rate.

According to another aspect of the present invention, there is also provided a circuit for driving a liquid crystal display device using low power. The circuit includes a display data latch, a gamma decoder, and a driver cell circuit. The display data latch latches display data from the memory. The gamma decoder receives a plurality of gray scale voltages, and selects and outputs one of the plurality of gray scale voltages in response to the display data. The driver cell circuit receives an output voltage of the gamma decoder and generates an output voltage applied to the liquid crystal display device. The driver cell circuit controls slew rate in response to results of comparison of current data and previous data of the display data.

Preferably, the driver cell circuit includes a previous data latch, a bias control voltage generator, and a driver amplifier. The previous data latch receives at least a portione of the display data and outputs the portion or the whole of the display data as the previous data. The bias control voltage generator compares the current data and the previous data of the display data and generates a control signal. The driver amplifier receives the output voltage of the gamma decoder, generates the output voltage applied to the liquid crystal display device, and controls the slew rate in response to the control signal.

According to still another aspect of the present invention, there is also provided a method of driving a liquid crystal display device in a driver circuit having a driver amplifier for receiving a gray scale voltage and generating an output voltage for driving the liquid crystal display device using low power. At least a portion of the display data is latched and previous data is generated. The previous data is compared with current data of the display data and a control signal is generated. A bias current of the driver amplifier is controlled in response to the control signal. Preferably, the number of bits of the current data is equal to the number of bits of the previous data.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIG. 13 is a truth table of a control signal generated by the bias control voltage generator shown in FIG. 11.

DETAILED DESCRIPTION OF THE INVENTION

Figure 1:
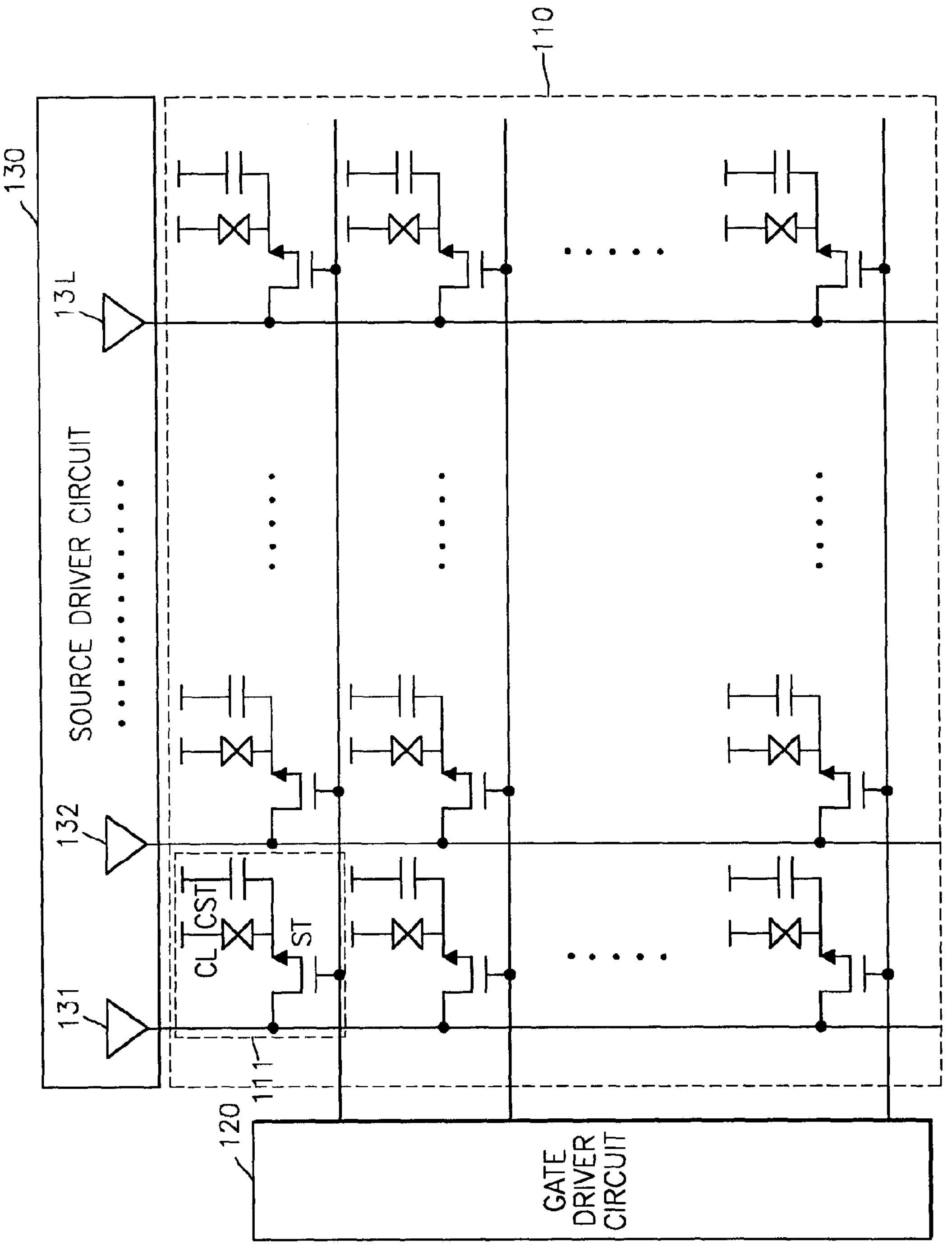
FIG. 1 (PRIOR ART)
FIG. 1 contains a schematic block diagram of a general TFT-LCD device.
Figure 5:
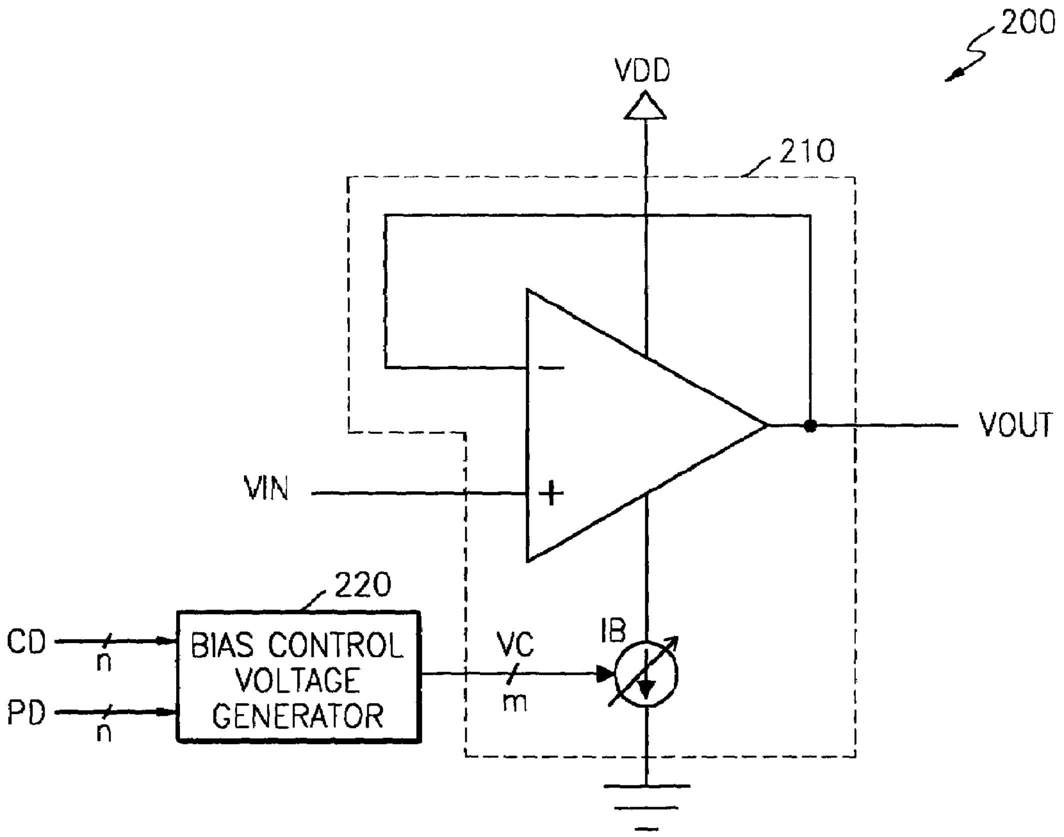
FIG. 5 is a schematic block diagram of a driver cell, a slew rate of which is adaptively controlled according to an embodiment of the present invention.

FIG. 5 is a schematic view of a driver cell, a slew rate of which is adaptively controlled according to an embodiment of the present invention. The driver cell corresponds to the driver amplifiers 131 through 13L, which are actually ends of channels for liquid crystal in the source driver circuit 130 shown in FIG. 1. The driver cell is installed in each channel. However, the driver cell of the present invention is not a circuit having only a general driver amplifier, but a driver circuit having a driver amplifier whose slew rate is controlled and an additional circuit for controlling the slew rate.

Referring to FIG. 5, a driver cell 200, a slew rate of which is adaptively controlled, according to an embodiment of the present invention includes a driver amplifier 210 and a bias control voltage generator 220.

The driver amplifier 210 amplifies or buffers an input voltage VIN to generate an output voltage VOUT which will be applied to a liquid crystal panel (not shown). A slew rate of the driver amplifier 210 is controlled by controlling a bias current IB using a control signal VC.

The bias control voltage generator 220 compares previous display data PD with current display data CD that are input to each channel to generate the control signal VC for controlling the bias current IB of the driver amplifier 210. If a variation in the output voltage VOUT of the driver amplifier 210 of a corresponding channel is great due to a large difference between the previous display data PD and the and the current display data CD, the bias control voltage generator 220 generates a control signal VC that controls the bias current IB so that a large amount of the bias current IB flows through the driver amplifier 210, thereby increasing the slew rate of the driver amplifier 210. In contrast, if a variation in the output voltage VOUT of the driver amplifier 210 of a corresponding channel is small due to a small difference between the previous display data PD and the current display data CD, the bias control voltage generator 220 generates a control signal VC that controls the bias current IB so that a small amount of the bias current IB flows through the driver amplifier 210, thereby reducing the slew of the driver amplifier 210. As a result, the bias current IB is prevented from flowing more than necessary by allowing a necessary amount of the bias current IB to adaptively flow through the driver amplifier 210, so that power consumption is reduced. Here, the current display data CD and the previous data PD are signals composed of n bits and the control signal VC is a voltage signal composed of m bits. A control step can be subdivided by increasing the m bits. That is, if m increases, a control resolution increases.

Figure 6:
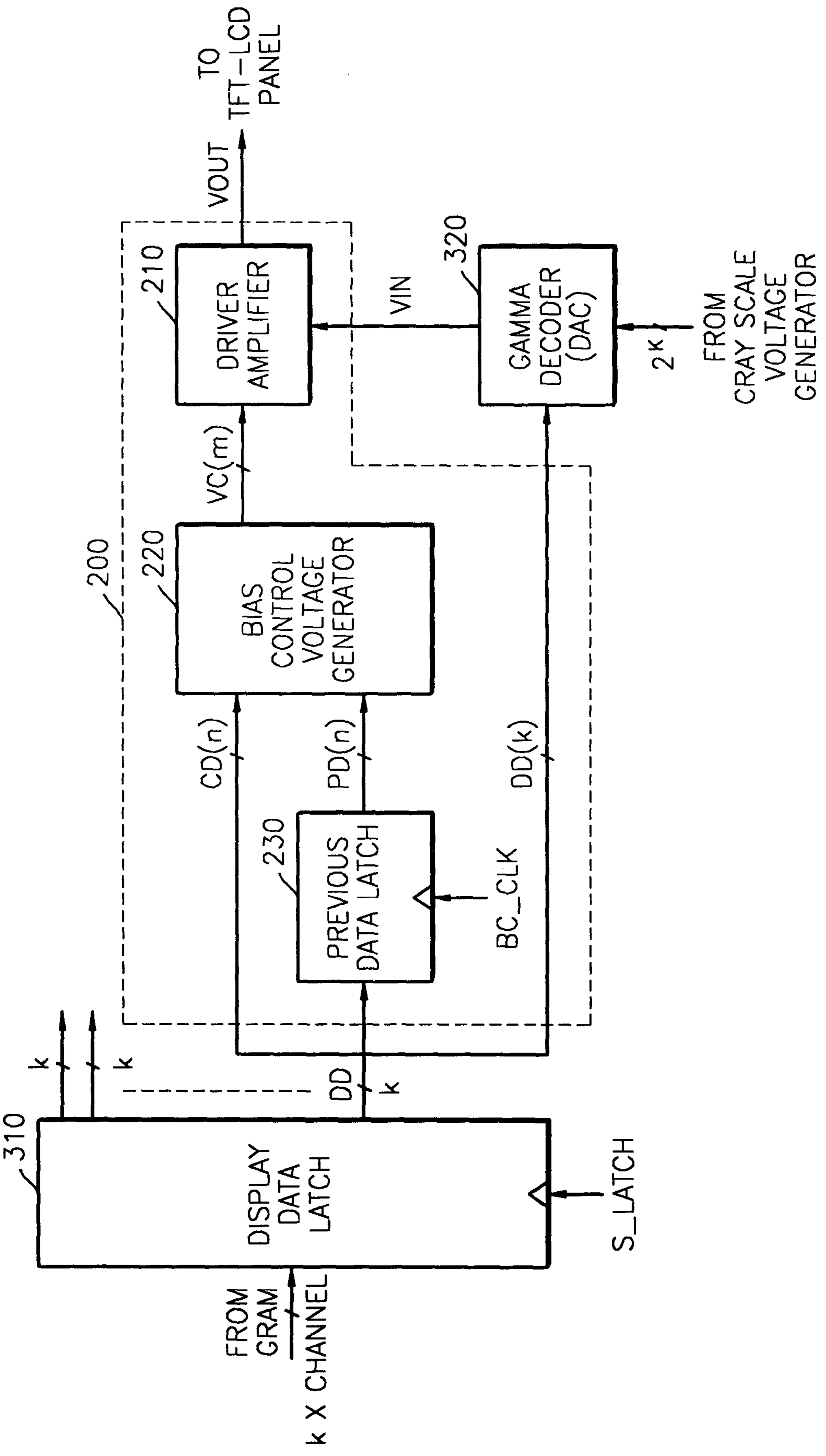
FIG. 6 is a block diagram of an LCD device driving circuit according to an embodiment of the present invention.

FIG. 6 is a block diagram of an LCD device driving circuit according to an embodiment of the present invention. The LCD device driving circuit corresponds to the source driver circuit 130 shown in FIG. 1.

Referring to FIG. 6, the LCD device driving circuit includes a plurality of driver cells 200, a display data latch 310, and a gamma decoder 320. In FIG. 6, one of the plurality of driver cells 200 is shown.

The driver cell 200 is a driver circuit, a slew rate of which is adaptively controlled. The driver cell 200 includes a driver amplifier 210, a bias control voltage generator 220, and a previous data latch 230.

The display data latch 310 latches display data DD from a graphic memory GRAM and transmits the display data DD to the plurality of driver cells 200. Here, the display data DD corresponding to a channel CHANNEL is input to one of the plurality of driver cells 200. The display data DD is composed of k bits.

The gamma decoder 320 receives a plurality of gray scale voltages, selects one of the plurality of gray scale voltages in response to the display data DD, and outputs the selected gray scale voltage as an input voltage VIN of the driver amplifier 210. Since the number of bits of the display data DD is k, it is preferable that the number of gray scale voltages is $2^k$.

The previous data latch of the driver cell 200 is an n bit latch which receives and latches n bits of the k bits of the display data DD. The n bits of the previous data latch 230 may be the whole or a portion of the k bits of the display data DD. That is, n is less than or equal to k.

The bias control voltage generator 220 receives and compares current data CD and the previous data PD, each of which is composed of n bits. The current data CD is n bits data of the display data DD of k bits received from the display data latch 310. Thus, the current data PD is a portion or the whole of current display data DD. The previous data PD is n bit data received from the previous data latch 230.

The bias control voltage generator 220 compares the current data CD and the previous data CD and then generates a control signal VC composed of m bits for controlling a bias current IB of the driver amplifier 210 based on the difference between the current data CD and the previous data PD.

The driver cell 200 receives a voltage VIN output from the gamma decoder 320 and generates an output voltage VOUT that will be applied to an LCD panel (not shown). The bias current IB of the driver amplifier 210 is determined in response to the control signal VC. The slew rate of the driver amplifier 210 is determined by the bias current IB. Thus, the driver amplifier 210 drives pixels of the LCD device by using the slew rate determined by the control signal VC. As the number m of bits constituting the control signal VC is great, the slew rate of the driver amplifier 210 can be precisely controlled.

Figure 7:
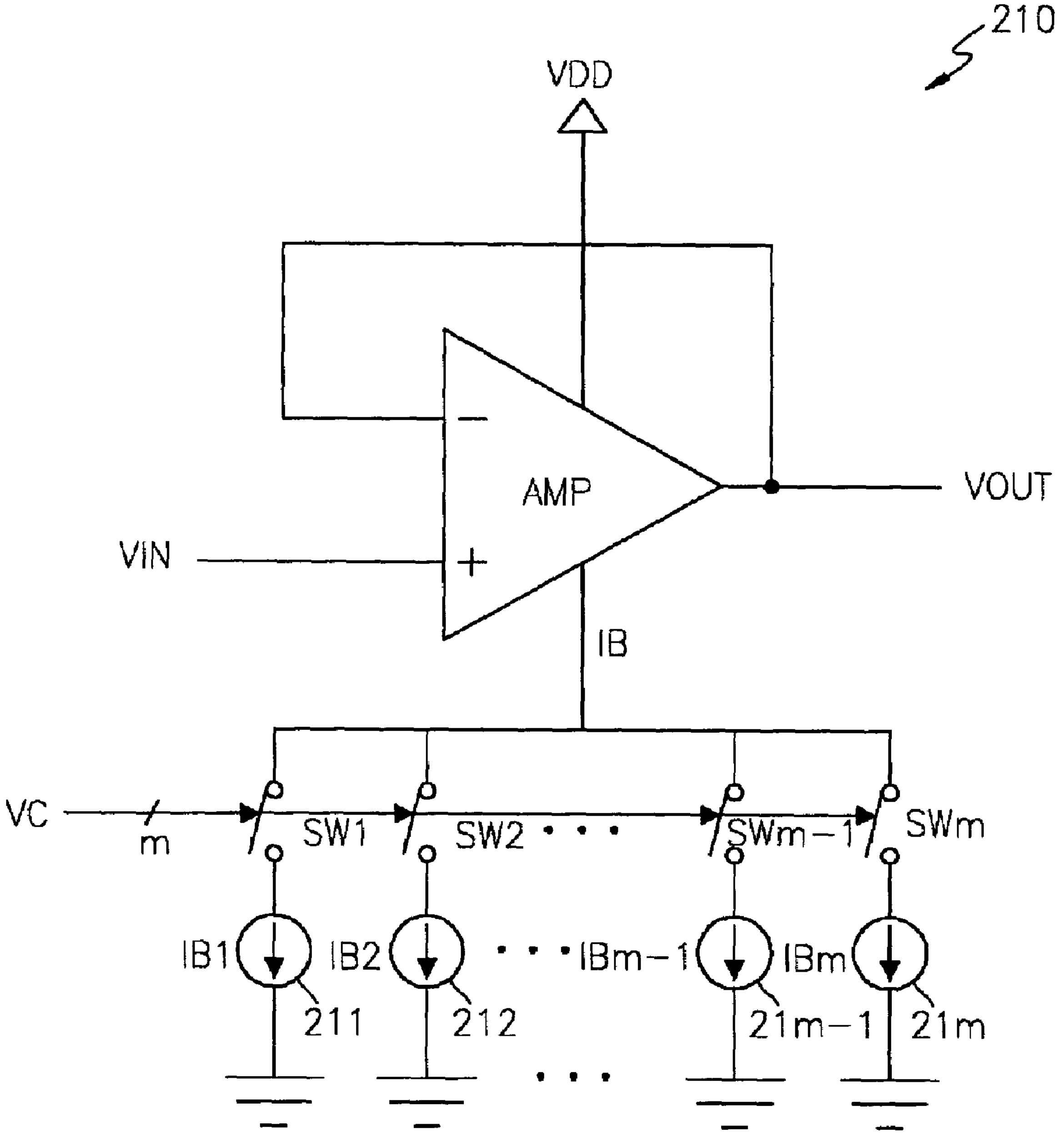
FIG. 7 is a diagram of another embodiment of a driver amplifier shown in FIG. 6.

FIG. 7 is a view of another embodiment of the driver amplifier 210 shown in FIG. 6. Referring to FIG. 7, the driver amplifier 210 includes an amplifier AMP, m bias current sources 211 through 21*m*, and m switches SW1 through SWm.

The amplifier AMP buffers or amplifies an input voltage VIN and then generates an output voltage VOUT. The m bias current sources 211 through 21*m* are formed between the amplifier AMP and ground voltages. Let us assume that the intensitites of currents flowing through the m bias current sources 211 through 21 are IB1, IB2, . . . , and IBm.

The m switches SW1 through SWm are disposed between the amplifier AMP and the bias current sources 211 through 21*m* to control the connection between a corresponding bias current source and the amplifier AMP. The m switches SW1 through SWm are turned on/off in response to the control signal VC composed of m bits. That is, the first switch SW1 is turned on/off in response to the first bit of the control signal VC, the second switch SW2 is turned on/off in response to the second bit of the control signal VC, and the other switches SW3 through SWm are turned on/off in response to corresponding bits of the control signal VC.

Therefore, the bias current IB varies depending on whether the m switches SW1 through SWm are turned on/off.

Figure 8:
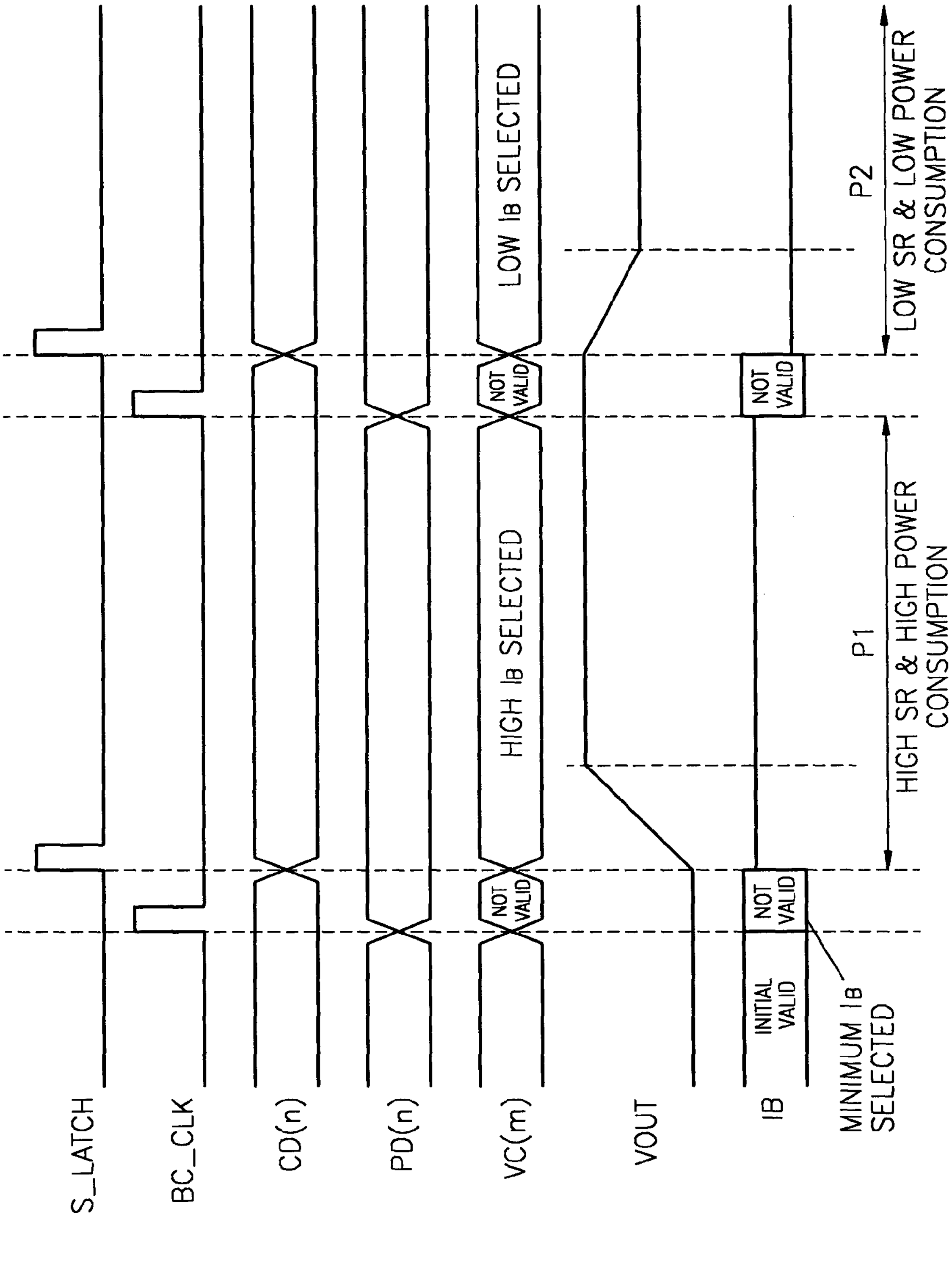
FIG. 8 is a timing diagram illustrating waveforms of signals and variations in a bias current in the LCD device driving circuit shown in FIG. 6.

FIG. 8 illustrates waveforms of main signals and variations in the bias current IB in the LCD device driving circuit shown in FIG. 6. Referring to FIG. 8, the display data latch 310 outputs the current data CD in response to the rising edge of a data latch signal S_LATCH and the previous data latch 230 outputs the previous data PD in response to the rising edge of a previous data latch clock BC_CLK.

An instant of time when the previous data latch clock BC_CLK necessary for latching and outputting the previous data PD is generated is ahead of an instant of time when the data latch signal S_LATCH is generated, so that the previous data PD is ahead of the current data CD.

The bias control voltage generator 220 generates the control signal VC based on the difference between the current data CD and the previous data PD. Thus, a non-valid control signal VC is generated in a section (hereinafter referred to as an ineffective section) between the rising edge of the previous data latch clock BC_CLK and the rising edge of the data latch signal S_LATCH. Therefore, the bias current IB in the ineffective section is also a non-valid value. Since in the ineffective section, the previous data PD is equal to the current data CD, a selected bias current IB becomes the minimum value. The ineffective section is not a great problem since the ineffective section is created after an output of the driver amplifier 210 reaches a target voltage and is stabilized. Rather, since the smallest bias current IB is selected, the ineffective section helps a low power operation. As shown in FIG. 8, in a section P1 where a variation in the output voltage VOUT is great, i.e., in a case where the difference between the previous data PD and the current data CD is great, a large amount of bias current IB flows due to the control signal VC. In contrast, in a section P2 where the variation in the output voltage VOUT is small, i.e., in a case where the difference between the previous data PD and the current data CD is small, a small amount of bias current IB flows due to the control signal VC.

Figure 9:
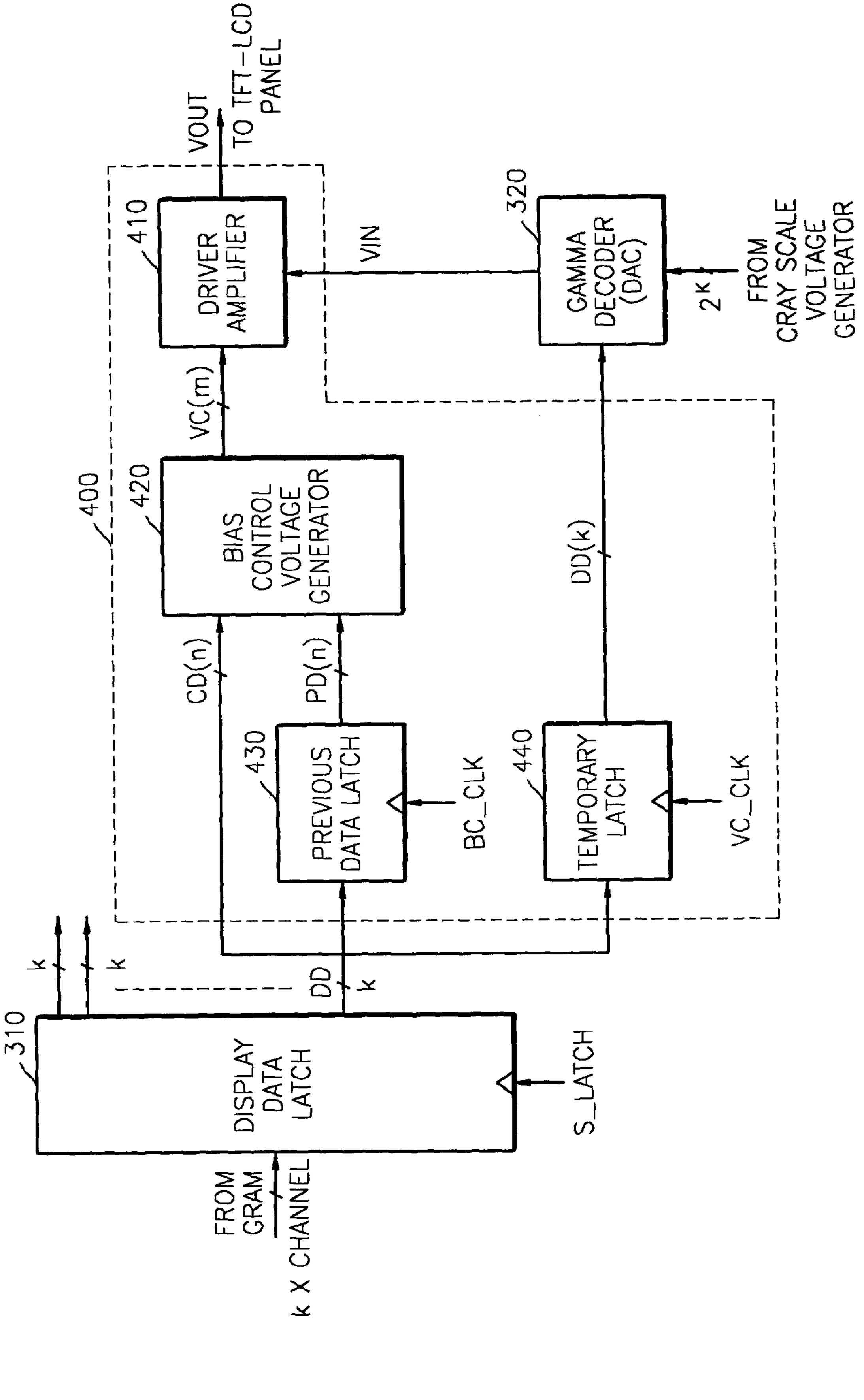
FIG. 9 is a block diagram of an LCD device driving circuit according to another embodiment of the present invention.

FIG. 9 is a block diagram of an LCD device driving circuit according to another embodiment of the present invention. Slew rate of a driver cell 400 is adaptively controlled. The driver cell 400 does not have an ineffective section as the driver cell 200 shown in FIG. 6.

Referring to FIG. 9, the LCD device driving circuit includes as many driver cells 400 as the number of channels CHANNEL, a display data latch 310, and a gamma decoder 320. In FIG. 9, only one of the driver cells 400 is shown.

The display data latch 310 and the gamma decoder 320 are the same as the display data latch 310 and the gamma decoder 320 shown in FIG. 6, and thus their detailed descriptions will not be repeated here.

The driver cell 400 includes a driver amplifier 410, a bias control voltage generator 420, a previous data latch 430, and a temporary latch 440.

The operation and structure of the previous data latch 430 and the driver amplifier 410 are the same as those of the previous data latch 230 and the driver amplifier 210 shown in FIG. 6, and thus their descriptions will not be repeated.

The bias control voltage generator 420 compares current data CD and the previous data PD in response to a temporary clock VC_CLK and then generates a control signal VC. Thus, it is preferable that an instant of time when the temporary clock VC_CLK is generated is delayed compared with an instant of time when a data latch signal S_LATCH is generated. Since the bias control voltage generator 420 is synchronized with the temporary clock VC_CLK to generate the control signal VC, an ineffective section as shown in FIG. 8 is not created.

The temporary latch 440, which is synchronized with the temporary clock VC_CLK, is used to prevent the display data from being input to the gamma decoder 320 before a bias current IB is selected by the control signal VC.

The temporary latch 440, which is a k-bit latch, latches current data CD input from the display data latch 310 and outputs the current data CD in response to the rising edge of the temporary clock VC_CLK.

Figure 10:
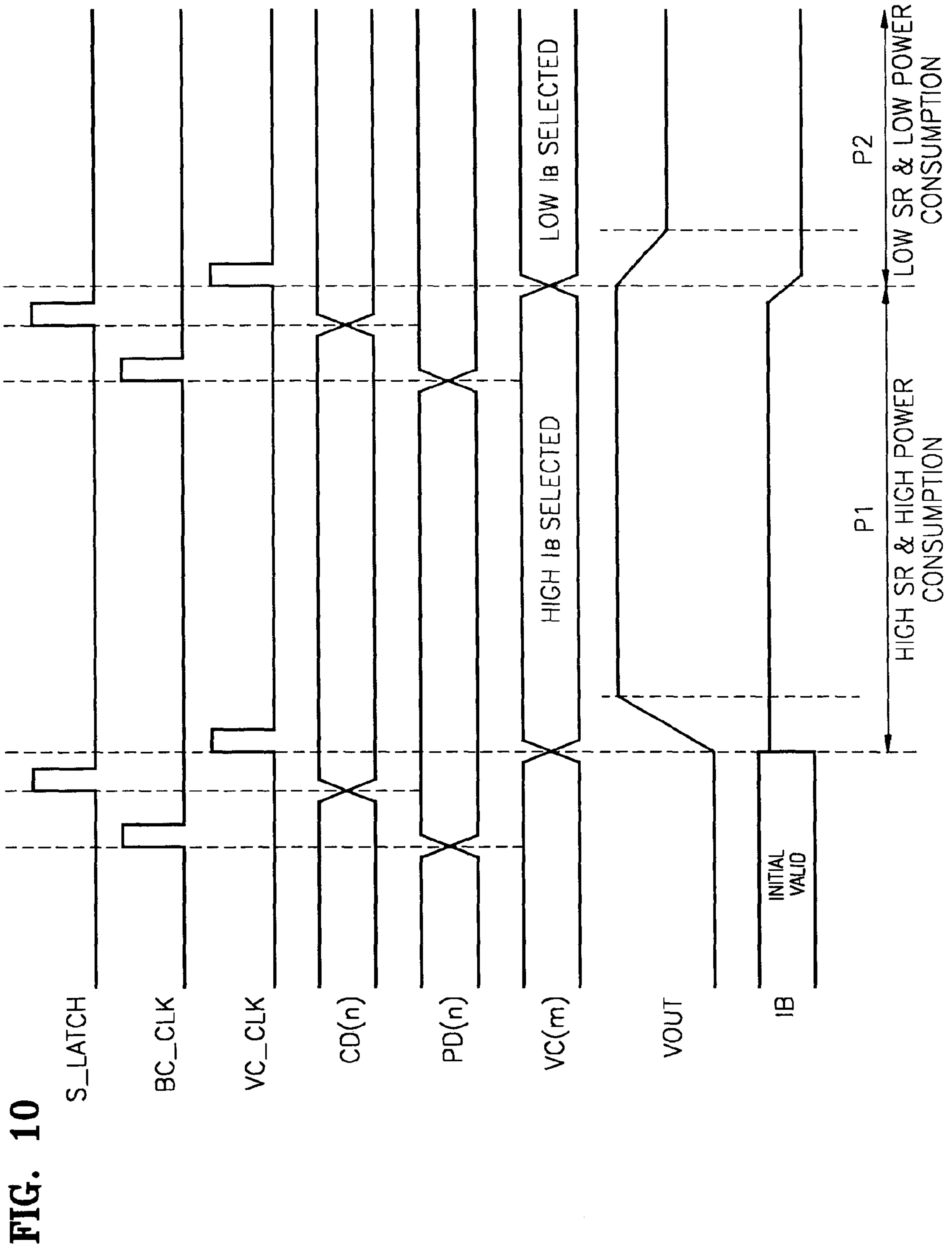
FIG. 10 is a timing diagram illustrating waveforms of signals and variations in a bias current in the LCD device driving circuit shown in FIG. 9.

FIG. 10 is a timing diagram illustrating waveforms of main signals and variations in a bias current in the LCD device driving circuit shown in FIG. 9. Referring to FIG. 10, the display data latch 310 outputs the current data CD in response to the rising edges of the data latch signal S_LATCH. The previous data latch 430 outputs the previous data PD in response to the rising edge of the previous data latch clock BC_CLK.

The bias control voltage generator 420 generates the control signal VC in response to the temporary clock VC_CLK. Thus, as described above, the ineffective section is not created.

As described with reference to FIG. 8, in FIG. 9, in a section P1 where a variation in the output voltage VOUT is great, i.e., in a case where the difference between the previous data PD and the current data CD is great, a large amount of bias current IB flows due to the control signal VC. In contrast, in a section P2 where the variation in the output voltage VOUT is small i.e., in a case where the difference between the previous data PD and the current data CD is small, a small amount of bias current IB flows due to the control signal VC.

Figure 2:
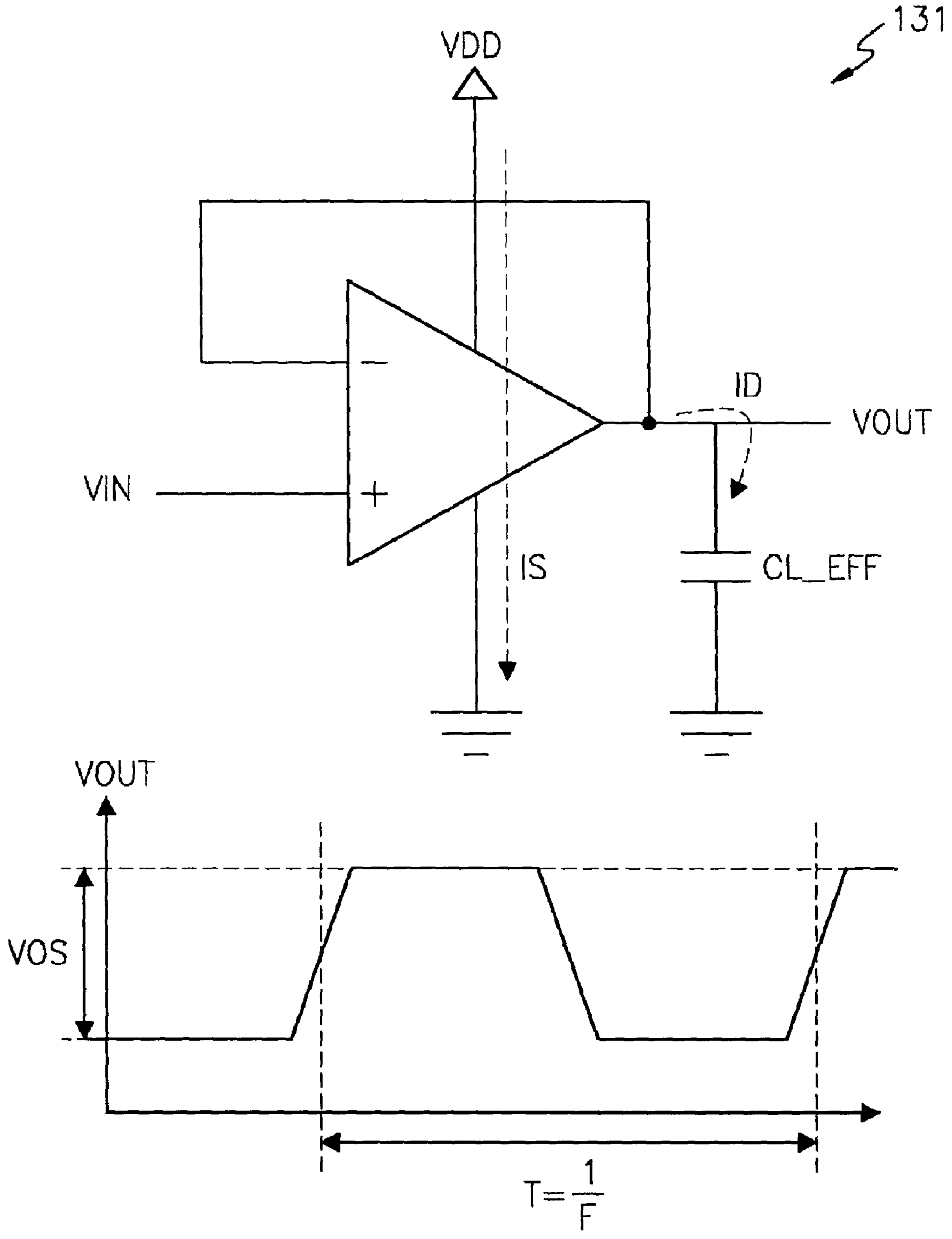
FIG. 2 (PRIOR ART)
FIG. 2 contains a schematic block diagram of the driver amplifier shown in FIG. 1.
Figure 3:
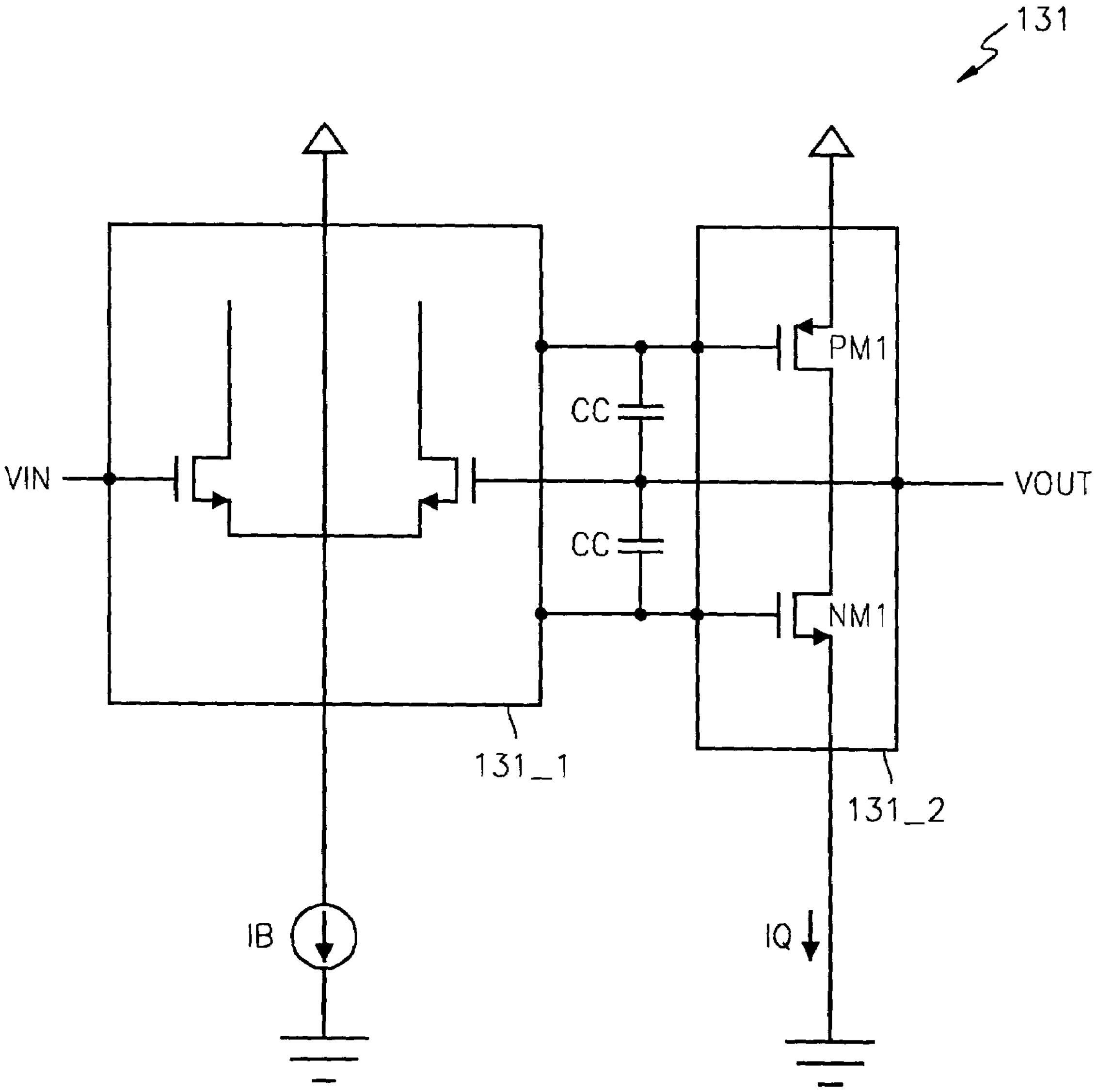
FIG. 3 (PRIOR ART)
FIG. 3 contains a schematic block diagram illustrating a more detailed configuration of the driver amplifier shown in FIG. 1.
Figure 4:
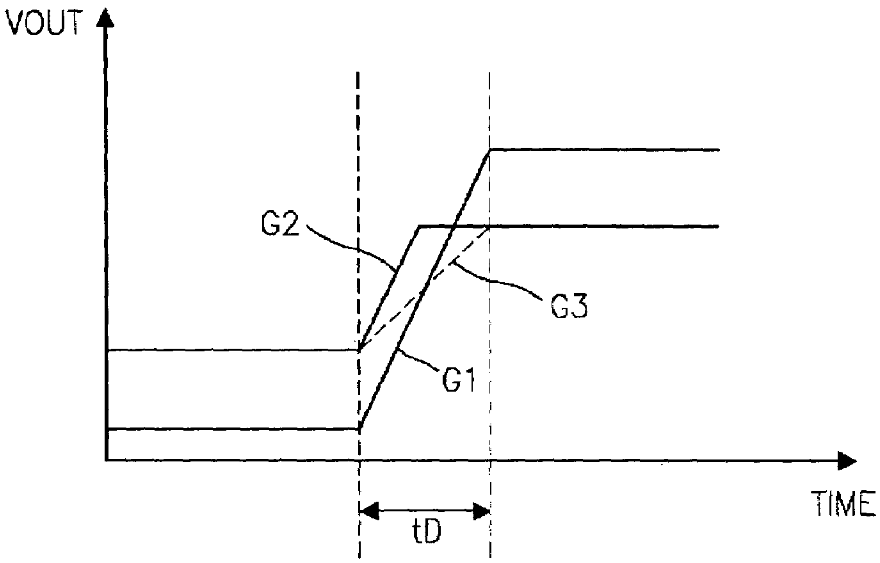
FIG. 4 (PRIOR ART)
FIG. 4 contains a graph illustrating the output characteristics of a driver amplifier according to the prior art.
Figure 11:
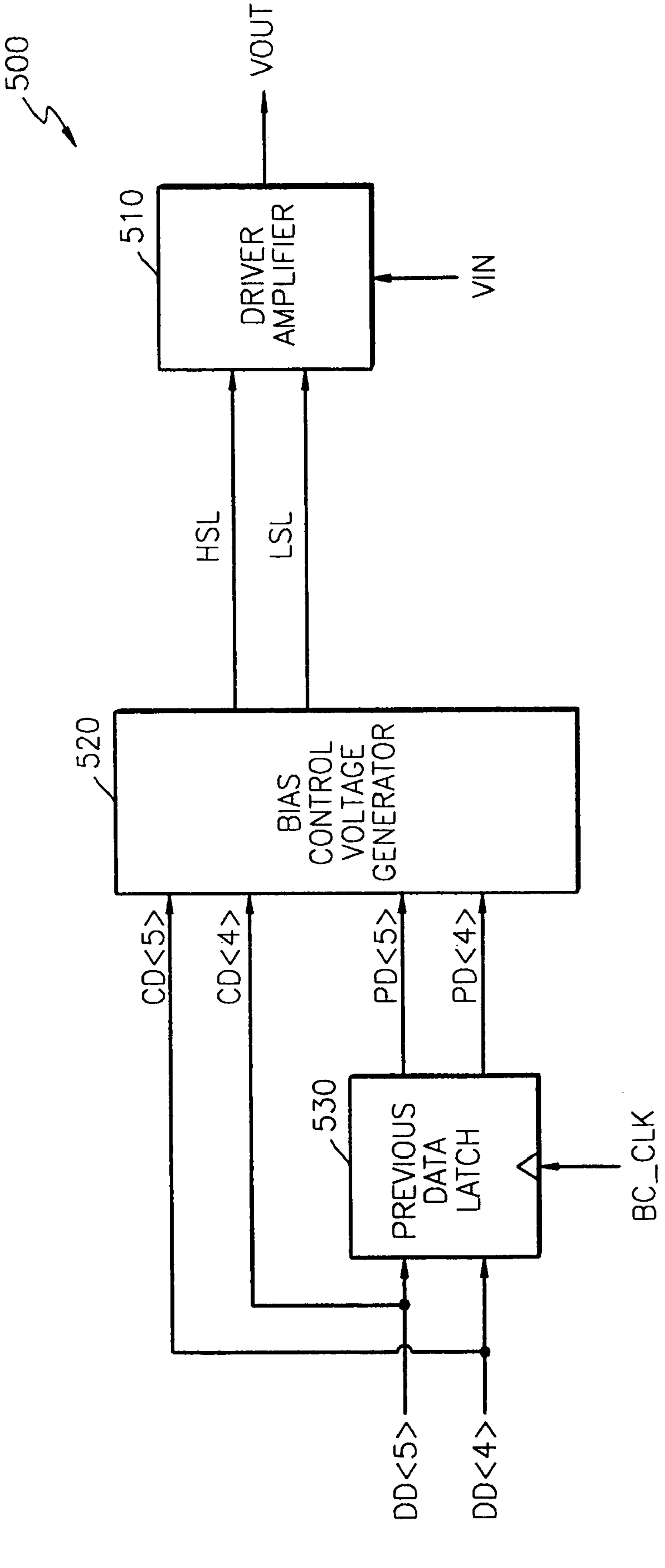
FIG. 11 is a diagram of another embodiment of a driver cell shown in FIG. 6.

FIG. 11 is a view of another example of the driver cell 200 shown in FIG. 6. Referring to FIG. 11, a driver cell 500 includes a previous data latch 530, a bias control voltage generator 520, and a driver amplifier 510. The operation of the driver cell 500 is generally the same as that of the driver cell 200 shown in FIG. 2.

However, the driver cell 500 shown in FIG. 11 uses 4 bits of 6 bits of display data DD as current data CD and previous data PD. A bias current IB of the driver amplifier 510 is controlled by using a control signal VC composed of two bits HSL and LSL. That is, in the driver cell 500, k is 6, n is 2 and m is 2.

The previous data latch 530 latches 2 bits of 6 bits of the display data DD and outputs previous data (PD<5><4>) of 2 bits in response to a previous data latch signal BC_CLK.

The bias control voltage generator 520 receives 2 bits of the display data DD as current data (CD<5><4>) of 2 bits, compares the current data (CD<5><4>) with the previous data (PD<5><4), and generates the control signal VC. That is, the bias control voltage generator 520 compares 2 bits of previous display data and 2 bits of current display data and generates the control signal VC based on the difference between 2 bits of the previous display data and 2 bits of the current display data. The control signal VC is composed of 2 bits of a high bit HSL and a low bit LSL. The driver amplifier 510 is controlled so as to be driven in one of two modes. That is, if the high bit HSL of the control signal VC is high ("1"), a large amount of bias current IB flows through the driver amplifier 510 to increase the slew rate. If the low bit LSL of the control signal VC is high ("1"), a small amount of bias current IB flows through the driver amplifier 510 to lower the slew rate.

Figure 12:
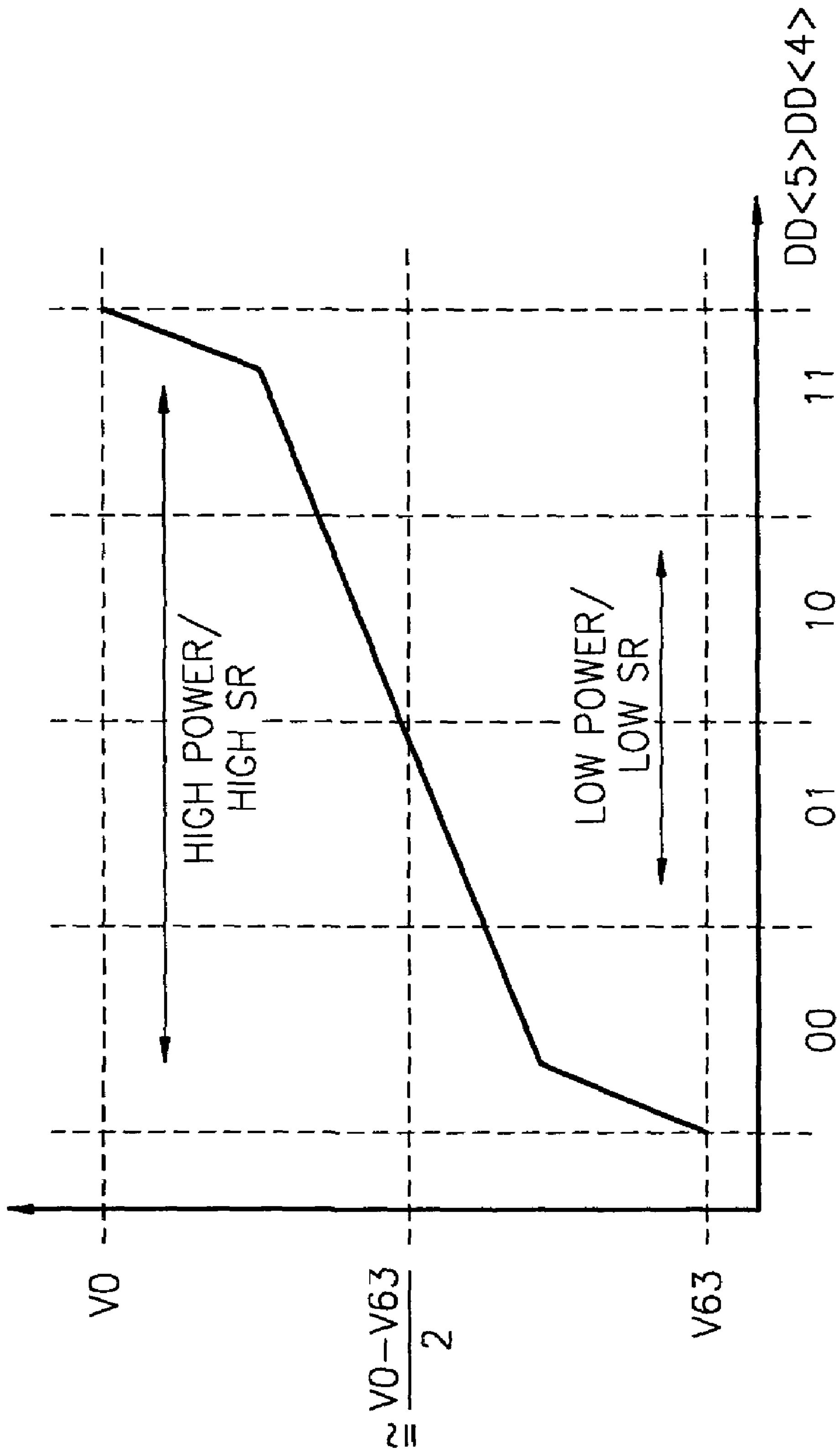
FIG. 12 is a graph illustrating a relationship between two bits of display data and the level of a gradation voltage.

FIG. 12 is a view illustrating a relationship between 2 bits of the display data DD and the level of a gray scale voltage in the driver cell 500 shown in FIG. 11. Referring to FIG. 12, since previous data PD and current data CD use 2 bits of display data DD, previous data (PD<5><4>) and current data (CD<5><4>) may have the values 00, 01, 10, or 11. Since the total number of bits of the display data DD is 6, the level of the gray scale voltage has one of 64 voltage levels V0 through V63. As shown in FIG. 12, the relationship graph between the display data DD and the gray scale voltage is called a gamma curve.

If the difference between the previous data PD and the current data CD is two or more steps (e.g., if the previous data PD<5>PD<4>=00 and the current data CD<5>CD<4>=10 or 11), the range of a variation in an output voltage of the driver amplifier 510 increases. As a result, a high bit HSL of the control signal VC becomes 1, a large amount of bias current IB flows through the driver amplifier 510, and the slew rate increases. In contrast, if the difference between the previous data PD and the current data CD is one or less step (e.g., if previous data PD<5>PD<4>=00 and current data CD<5>CD<4>=00 or 01), the range of the variation in the output voltage of the driver amplifier 510 is small. As a result, a low bit LSL of the control signal VC becomes 1, a small amount of bias current IB flows through the driver amplifier 510, and the slew rate decreases.

If the gamma curve is symmetrical and the gray scale voltage in the center of the gamma curve is a value close to (V0-V63)/2, it is preferable that the amount of bias current IB flowing when the low bit LSL of the control signal VC is 1 is half of the amount of bias current IB flowing when the high bit HSL of the control signal VC is 1.

FIG. 13 is a truth table of a control signal (HSL, LSL) generated by the bias control voltage generator 520 shown in FIG. 11. Referring to FIG. 13, as described with reference to FIG. 12, if the difference between previous data PD<5><4> and current data CD<5><4> is two or more steps, a high bit HSL of the control signal becomes 1 and a low bit LSL of the control signal becomes 0. In contrast, if the difference between previous data PD<5><4> and current data CD<5><4> is less than two steps, the high bit HSL of the control signal becomes 0 and the low bit LSL of the control signal becomes 1.

Figure 14:
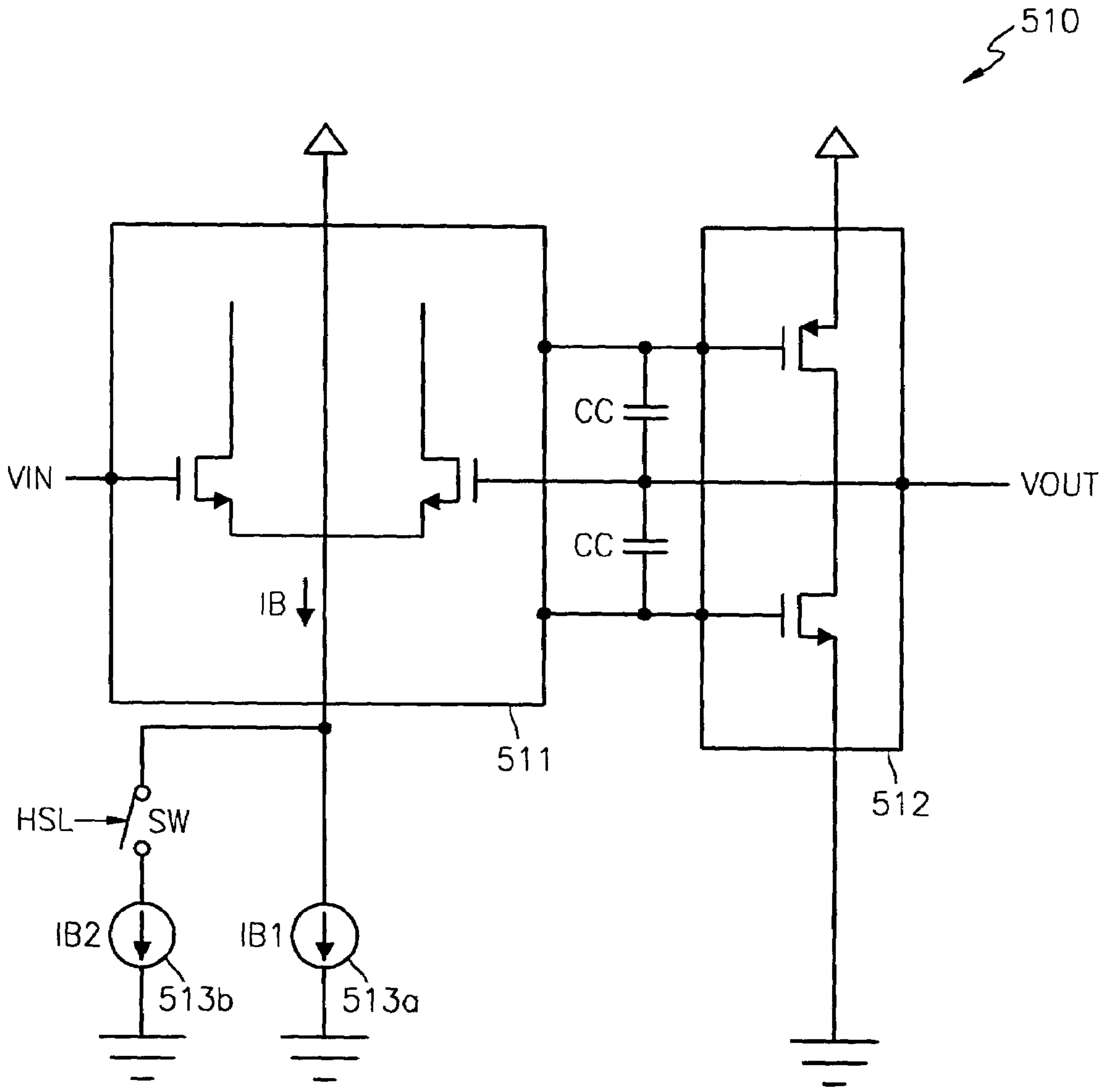
FIG. 14 is a circuit diagram illustrating the configuration of the driver amplifier in more detail.

FIG. 14 is a circuit diagram of the driver amplifier 510 shown in FIG. 11. Referring to FIG. 14, the driver amplifier 510 includes an amplifying stage 511 and a driving stage 512. The driver amplifier 510 further includes first and second bias current sources 513*a* and 513*b* and a switch SW. Let us assume that a bias current IB supplied to the amplifying stage 511 is composed of IB1 and IB2 generated from the first and second bias current sources 513*a* and 513*b*.

The switch SW is disposed between the amplifying stage 511 and the second bias current source 513*b* and turned on/off in response to a high bit HSL of a control signal. If the high bit HSL of the control signal is 1, the switch SW is turned on. As a result, the bias current IB2 by the second bias current source 513*b* flows into the amplifying stage 511. In contrast, if the high bit HSL of the control signal is 0, i.e., a low bit LSL of the control signal is 1, the switch SW is turned off. As a result, the bias current IB2 from the second bias current source 513*b* does not flow into the amplifying stage 511.

Accordingly, if the high bit HSL of the control signal is 1, the bias currents IB1 and IB2 flow into the amplifying stage 511, thereby increasing the slew rate. If the high bit HSL of the control signal is 0, the bias current IB1 flows into the amplifying stage 511, thereby reducing the slew rate.

As shown in FIG. 14, in a case where in the driver amplifier 510 has two types of bias current modes, the bias current IB of the driver amplifier 510 can be fully controlled by using a control signal of 1 bit. Thus, the control signal generated by the bias control voltage generator 520 shown in FIG. 11 may be composed of 1 bit.

According to the present invention, the slew rate of a driver amplifier can be adaptively controlled depending on variations in an output voltage applied to an LCD device. Thus, power consumed for driving the LCD device can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A driver circuit for driving a liquid crystal display device, the driver circuit comprising:

a previous data latch that receives at least a portion of display data and outputs the received display data as previous data;

a bias control voltage generator that compares current data of the display data with the previous data and generates a control signal, wherein the current data of the display data is generated in response to a data latch signal and the previous data is generated in response to a previous latch clock signal, wherein the data latch signal is generated independently of, and delayed with respect to, the previous latch clock signal, wherein the current data represents a current data value and the previous data represents a previous data value, and wherein the bias control voltage generator computes a mathematical difference between the current data value and the previous data value and generates the control signal based on the computed mathematical difference; and a driver amplifier that receives an input voltage, generates an output voltage, and controls a slew rate in response to the control signal.

2. The driver circuit of claim 1, wherein the driver amplifier controls a bias current in response to the control signal so as to control the slew rate.

3. The driver circuit of claim 2, wherein the bias control voltage generator generates the control signal so that a large amount of bias current flows in the driver amplifier as the difference between current data and the previous data is great.

4. The driver circuit of claim 2, further comprising a temporary latch that latches the current data in response to a temporary clock, wherein the bias control voltage generator generates the control signal in response to the temporary clock.

5. The method of claim 4, wherein the temporary clock is delayed with respect to the data latch signal.

6. The driver circuit of claim 2, wherein the driver amplifier comprises:

an amplifier that amplifies the input voltage;

two or more bias current sources that are positioned between the amplifier and ground voltages and supply currents flowing through the amplifier; and a switch that is positioned between the amplifier and the bias current sources and turned on or off in response to the control signal.

7. The driver circuit of claim 2, wherein the previous data and the current data are two bits of the display data, wherein the bias control voltage generator compares the previous data of two bits and the current data of two bits and then generates the control signal comprised of m (m is a natural number more than 1) bits.

8. The driver circuit of claim 7, wherein if the difference between a value of the previous data of two bits and a value of the current data of two bits is two or more steps, the control signal reaches a first level, while if the difference between a value of the previous data of two bits and a value of the current data of two bits is two or less steps, the control signal reaches a second level.

9. A circuit for driving a liquid crystal display device using low power, the circuit comprising:

a display data latch that latches display data from a memory;

a gamma decoder that receives a plurality of gray scale voltages, and selects and outputs one of the plurality of gray scale voltages in response to the display data; and a driver cell circuit that receives an output voltage of the gamma decoder and generates an output voltage applied to the liquid crystal display device, wherein the driver cell circuit controls a slew rate based on a control signal in response to a result of comparison of current data and previous data of the display data, wherein the current data is generated in response to a data latch signal and the previous data is generated in response to a previous latch clock signal, wherein the data latch signal is generated independently of, and delayed with respect to, the previous latch clock signal, wherein the current data represents a current data value and the previous data represents a previous data value, and wherein the driver cell circuit computes a mathematical difference between the current data value and the previous data value and generates the control signal based on the computed mathematical difference.

10. The circuit of claim 9, wherein the driver cell circuit comprises:

a previous data latch that receives a portion or the whole of the display data and outputs the portion of the whole of the display data as the previous data;

a bias control voltage generator that compares the current data and the previous data of the display data and generates the control signal; and a driver amplifier that receives the output voltage of the gamma decoder, generates the output voltage applied to the liquid crystal display device, and controls the slew rate in response to the control signal.

11. The circuit of claim 10, wherein the driver amplifier controls a bias current in response to the control signal so as to control the slew rate.

12. The circuit of claim 11, wherein the bias control voltage generator generates the control signal so that a large amount of bias current flows in the driver amplifier as the difference between current data and the previous data is great.

13. The circuit of claim 11, further comprising a temporary latch that latches the current data in response to a temporary clock, wherein the bias control voltage generator generates the control signal in response to the temporary clock.

14. The method of claim 13, wherein the temporary clock is delayed with respect to the data latch signal.

15. The circuit of claim 11, wherein the driver amplifier comprises:

an amplifier that amplifies the output voltage of the gamma coder;

two or more bias current sources that are positioned between the amplifier and ground voltages and supply currents flowing through the amplifier; and a switch that is positioned between the amplifier and the bias current sources and turned on or off in response to the control signal.

16. A method of driving a liquid crystal display device in a driver circuit having a driver amplifier for receiving a gray scale voltage and generating an output voltage for driving the liquid crystal display device using low power, the method comprising:

i. latching at least a portion or the whole of display data and generating previous data in response to a previous latch clock signal;

ii. comparing the previous data with current data of the display data and generating a control signal, wherein the current data of the display data is generated in response to a data latch signal and the previous data is generated in response to a previous latch clock signal, wherein the data latch signal is generated independently of, and delayed with respect to, the previous latch clock signal, wherein the current data represents a current data value and the previous data represents a previous data value, and wherein a mathematical difference between the current data value and the previous data value is computed, and the control signal based on the computed mathematical difference is generated; and iii. controlling a bias current of the driver amplifier in response to the control signal.

17. The method of claim 16, wherein the number of bits of the current data is equal to the number of bits of the previous data.

18. The method of claim 16, wherein in step (ii), the control signal is generated so that a bias current having a large intensity flows through the driver amplifier as the difference between the current data and the previous data is great.

19. The method of claim 16, wherein in step (ii), the control signal is generated in response to a temporary clock.

* * * * *